(12) United States Patent
Foster

(10) Patent No.: US 8,152,025 B2
(45) Date of Patent: Apr. 10, 2012

(54) VALVING FOR A REFILLABLE REUSABLE MIXER BOTTLE

(75) Inventor: Jason E. Foster, West Hollywood, CA (US)

(73) Assignee: Replenish Bottling, LLC, West Hollywood, CA (US)

(*) Notice: Subject to any disclaimer, the term of this patent is extended or adjusted under 35 U.S.C. 154(b) by 0 days.

(21) Appl. No.: 12/908,226

(22) Filed: Oct. 20, 2010

(65) Prior Publication Data

US 2011/0031271 A1 Feb. 10, 2011

Related U.S. Application Data

(63) Continuation-in-part of application No. 11/835,344, filed on Aug. 7, 2007, now Pat. No. 7,850,043.

(51) Int. Cl.
*B67D 7/74* (2010.01)

(52) U.S. Cl. ............... 222/129; 222/207; 206/219

(58) Field of Classification Search .............. 222/1, 157, 222/158, 83, 83.5, 207, 209, 180, 186, 181.2, 222/106, 133, 134.18; 206/219–222
See application file for complete search history.

(56) References Cited

U.S. PATENT DOCUMENTS

| | | | | | |
|---|---|---|---|---|---|
| 2,761,833 | A | * | 9/1956 | Ward | 210/85 |
| 3,094,250 | A | * | 6/1963 | Molyneaux et al. | 222/207 |
| 3,246,807 | A | * | 4/1966 | Micallef | 222/207 |
| 3,705,668 | A | * | 12/1972 | Schwartzman | 222/207 |
| 3,720,523 | A | * | 3/1973 | Nakagami | 426/115 |
| 4,159,790 | A | * | 7/1979 | Bailey | 222/211 |
| 4,356,848 | A | * | 11/1982 | Spies | 141/349 |
| 6,581,808 | B2 | * | 6/2003 | De Laforcade | 222/483 |

* cited by examiner

*Primary Examiner* — Lien Ngo

(74) *Attorney, Agent, or Firm* — Kleinberg & Lerner, LLP; Marvin H. Kleinberg

(57) ABSTRACT

A self-contained mixing and dispensing container having at least two chambers, includes a valving combination of two oppositely installed one-way valves by which fluid may be transferred from one chamber to another by deforming one chamber. One of the valves permits the transfer of fluid and the other valve, communicates with the ambient atmosphere, to permit air into the deformed chamber to replace the removed fluid.

14 Claims, 5 Drawing Sheets

VALVING FOR A REFILLABLE REUSABLE MIXER BOTTLE

CROSS-REFERENCE TO RELATED APPLICATIONS

The present application is a continuation-in-part of the continuation-in-part application Ser. No. 11/835,344, Filed: Aug. 7, 2007 from parent application Ser. No. 11/463,549 filed Aug. 9, 2006 and entitled "Refillable/Reusable Mixer Bottle".

BACKGROUND OF THE INVENTION

1. Field of the Invention

The present invention relates to improved valving for a container for storing, mixing, and dispensing measured volumes of liquid and a method of using the container.

2. Description of the Related Art

The present state of the art involves the use of "pump sprayers" attached to a container to apply liquids of varying functions to a desired area to be treated with the liquid. Various liquids may be used for cleaning, as pesticides, fertilizers, and for other functions. Upon using the contents of the container, the present state of the art teaches to either: dispose of the container and purchase a new one, or to refill the container after use, using a mixture of concentrate and water or a similarly pre-mixed solution or from a larger, bulk storage container.

The problems with the prior art are twofold. By disposing of the containers, an increased amount of waste is produced, adding to the global problem of waste management. By refilling the container with a concentrate, the end user is forced into contact with a potentially hazardous material in its concentrated form. The storage of the concentrate is also an issue as concentrated liquids have a shorter shelf life and are often hazardous and poisonous. This problem is further complicated by forcing the end user to measure the ideal ratio of concentrate to diluent to reproduce the desired effective mixture.

A number of containers have been developed which separately store two substances, and allow the two substances to be introduced to one another prior to being dispensed. U.S. Pat. Nos. 6,305,576, 6,152,296 and 6,073,803 all utilize the use of a puncturing or breaking device to allow the contents in the two containers to be mixed with one another. However, the use of the puncturing device renders the containers non-reusable.

U.S. Pat. No. 6,851,580 teaches a reusable container containing a small bottle positioned within a larger bottle, whereas the small bottle empties its contents into the large bottle using a release mechanism.

U.S. Pat. Nos. 4,646,948, 6,290,102 and 4,893,732 disclose containers having at least two chambers or compartments. One chamber acts as a reservoir for storing a liquid and the other chamber is a measuring and dispensing chamber arranged to receive a predetermined volume of liquid from the reservoir chamber and then to dispense the measured volume. All three prior patents disclose the transfer of liquid from the reservoir chamber to the measuring chamber by tilting the container or by squeezing the reservoir chamber to force the liquid into the measuring chamber. However, none of the prior patents disclose the mixing of liquids in the second chamber to form a third liquid.

SUMMARY OF THE INVENTION

It is an object of the invention to provide improved valving for a self-contained mixing and dispensing container which has a mechanism with which to measure and introduce the liquids to one another. It is another object of this invention to provide a mixing and dispensing container which is easy to manufacture and use. It is further an object of this invention to produce a mixing and dispensing container capable of having all chambers refillable, thus rendering the container reusable.

The present invention consists of a self contained mixing and dispensing container having at least two separable chambers, a mechanism by which fluid may be transferred from one chamber to another, a mechanism by which to dispense the mixture, and in one embodiment, openings on each of the chambers for refilling the chambers with the appropriate fluid.

The first chamber contains a concentration of the active solution and an outlet which can be connected to the second chamber. The first chamber is designed to either transfer a pre-determined amount of fluid per activation or a pre-determined amount after more than one activation, thus ensuring an accurate concentrate to diluent ratio. Transfer is initiated by manual deformation of the first chamber which creates a pressure differential between the first and second chambers, driving liquid out of the first chamber.

After the desired amount of concentrate has been transferred to the second chamber, the diluent is added to the second chamber through an aperture or through the top of the container. Once the second chamber is filled, the container is closed and the container is shaken to ensure thorough mixing of the component liquids. This process may be repeated, allowing the end user to increase or decrease the strength of the mixture.

In one embodiment, the concentrate is provided in a collapsible concentrate bag. Once the concentrate is empty the user may replace the concentrate bag or chamber with a new full bag.

In an alternative, preferred embodiment, the concentrate is maintained in a deformable chamber which communicates with the main chamber through a one way valve. A second, one way valve permits the introduction of air into the deformable chamber so that pressure can equalize and the chamber returns to its undeformed shape.

Each of the embodiments may include measurement means, built into the second chamber to allow the user to measure the amount of liquid added to the chamber. These measurement means allow users to adequately gauge the quantity of concentrate liquid prior to introducing a diluent.

These and other objects of the invention, as well as many of the intended advantages thereof, will become more readily apparent when reference is made to the following description, taken in conjunction with the accompanying drawings.

The descriptions which follow are to be understood as illustrative and exemplary of specific structures, aspects and features within the broad scope of the present invention and not as limiting of such broad scope. Like numbers refer to similar features of like elements throughout.

DETAILED DESCRIPTION OF THE INVENTION

Figure 1:
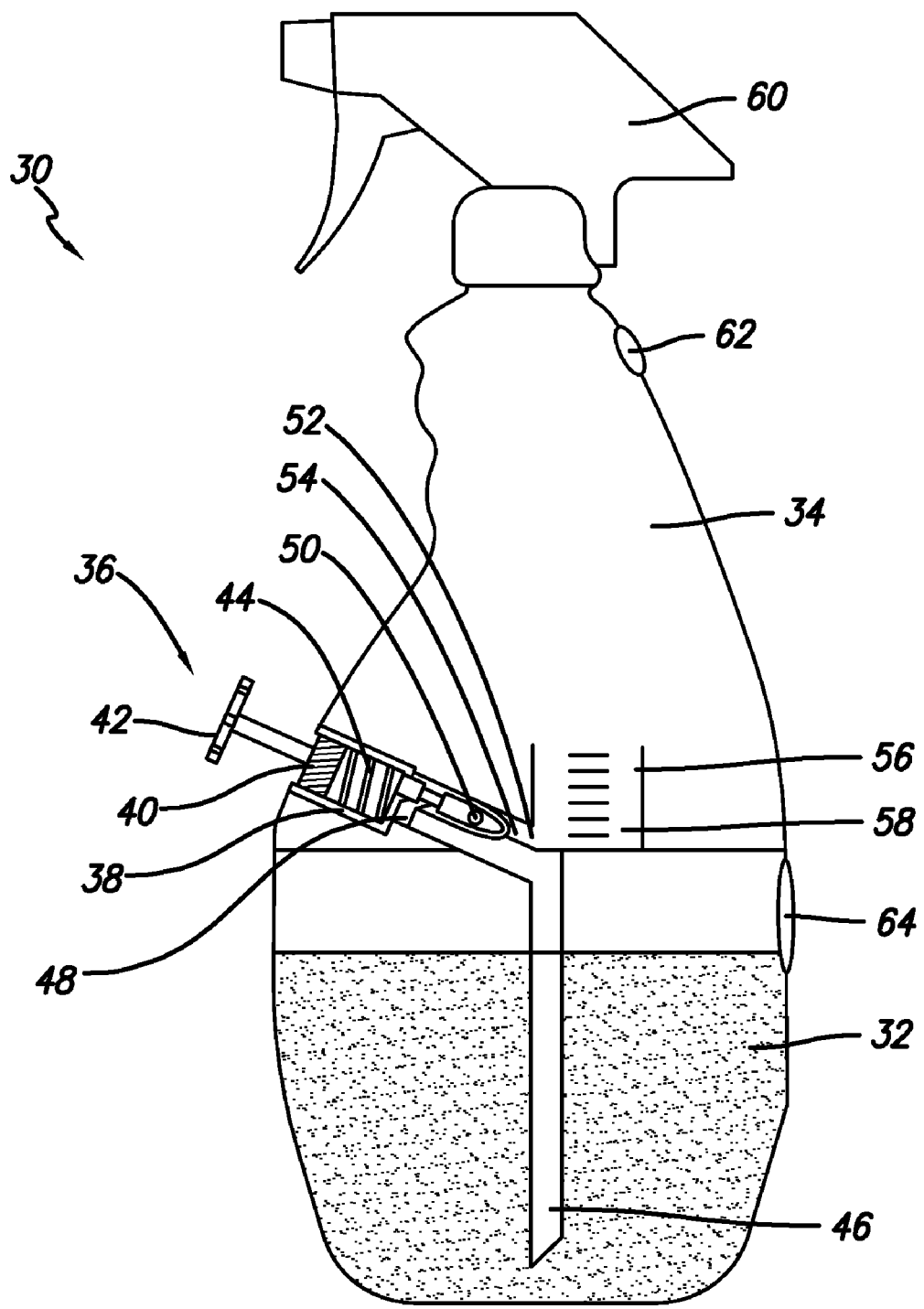
FIG. 1 is a side sectional view of a mixer container according to the present invention with a pump in the retracted position.

The invention will now be described with reference to FIG. 1, which illustrates in side view, the mixer container 30. The mixer container 30 includes the lower chamber 32 containing a liquid, an upper chamber 34 that is provided with a pump mechanism 36 which functions to pump fluid or liquid from the lower chamber 32 to the upper chamber 34. The pump mechanism 36 is provided with a pump cylinder 38, a piston 40, pump actuator 42, a coil spring 44 and a feed pipe 46 reaching the bottom of the lower chamber 32.

The pump mechanism 36 has a one way inlet valve 48 connected to the feed pipe 46 and an exit pipe 50 leading to an opening 52 containing a one way valve ball 54. The exit pipe 50 leads to a measurement container 56 having measurement graduations 58 thereon.

The mixer container 30 also has a dispensing mechanism 60. The upper chamber 34 has an aperture 62 as does the lower chamber 32, aperture 64. Aperture 62 and aperture 64 allow easy refilling of the independent upper chamber 34 and lower chamber 32.

In operation, the pump mechanism 36 is operated by manually pushing down the pump actuator 42, forcing the piston 40 down. This causes any liquid in the pump mechanism 36 to enter the measurement container 56 within the upper chamber 34. Once depressed, the piston rises, through action of the coil spring, causing liquid to enter the pump mechanism 36. This causes the flow of fluid or liquid from the lower chamber 32 through the feed pipe 46, past the one way valve 48, through the exit pipe 50 and one way valve ball 54, through the opening 52 and into the measurement container 56. The pump actuator 42 acts against a coil spring 44 located in the pump cylinder 38, which returns the pump actuator to its outward position for additional pumping. Upon completion of pumping, the pump actuator 42 returns to the outward position.

Figure 2:
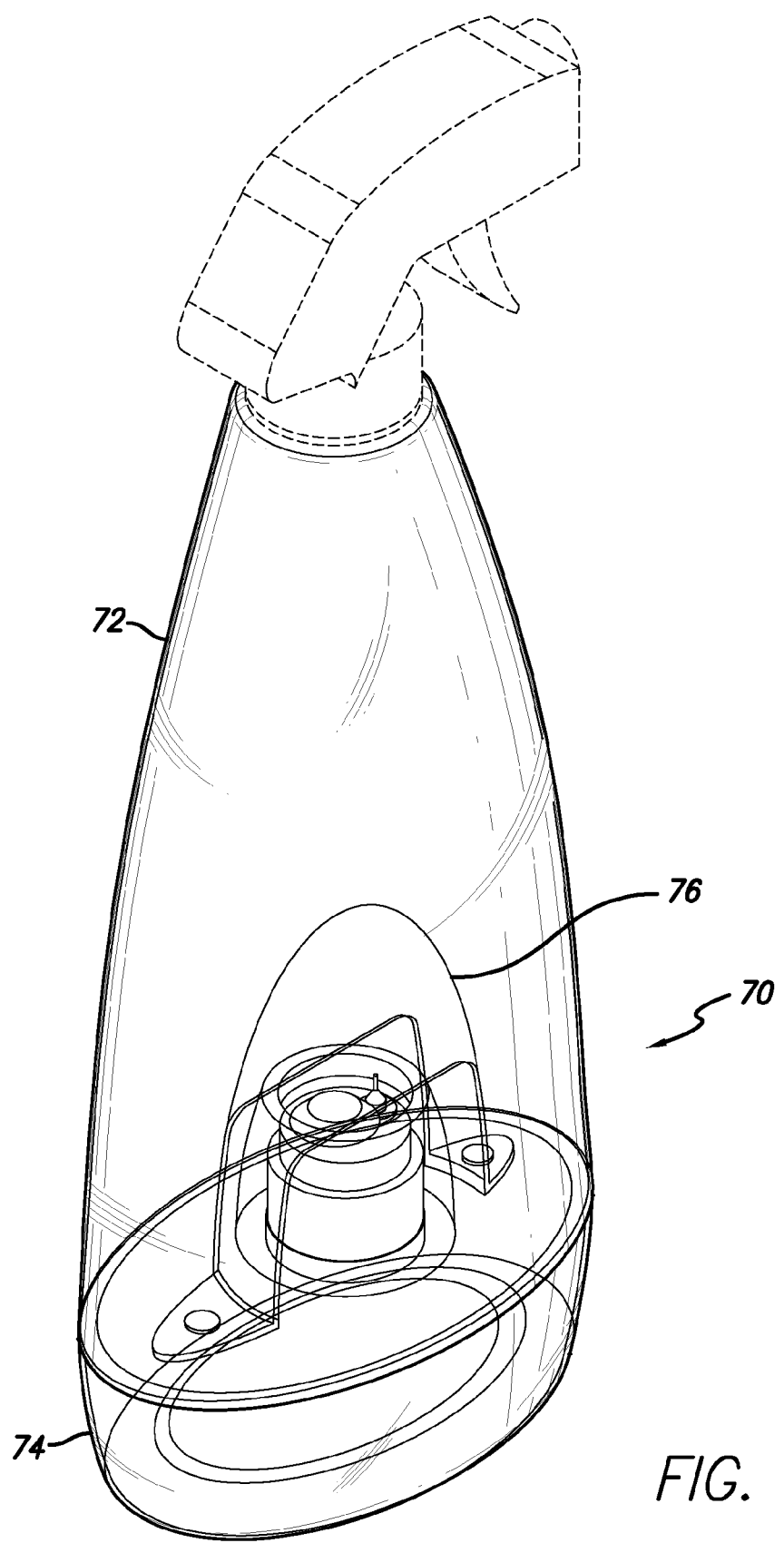
FIG. 2 is a perspective view of an alternative embodiment of a mixer container showing a second chamber attached to the first chamber.

Turning next to FIG. 2, there is shown a preferred embodiment of the present invention in an alternative mixer bottle 70. As shown, an upper chamber 72 is adapted to connect to a separable lower chamber 74 to which a concentrate can be supplied. A measurement container 76 is created in the interior of the upper chamber 72 and is positioned to receive fluid from the lower chamber 74. A removable spray nozzle and siphon tube assembly 78 is also shown.

Figure 3:
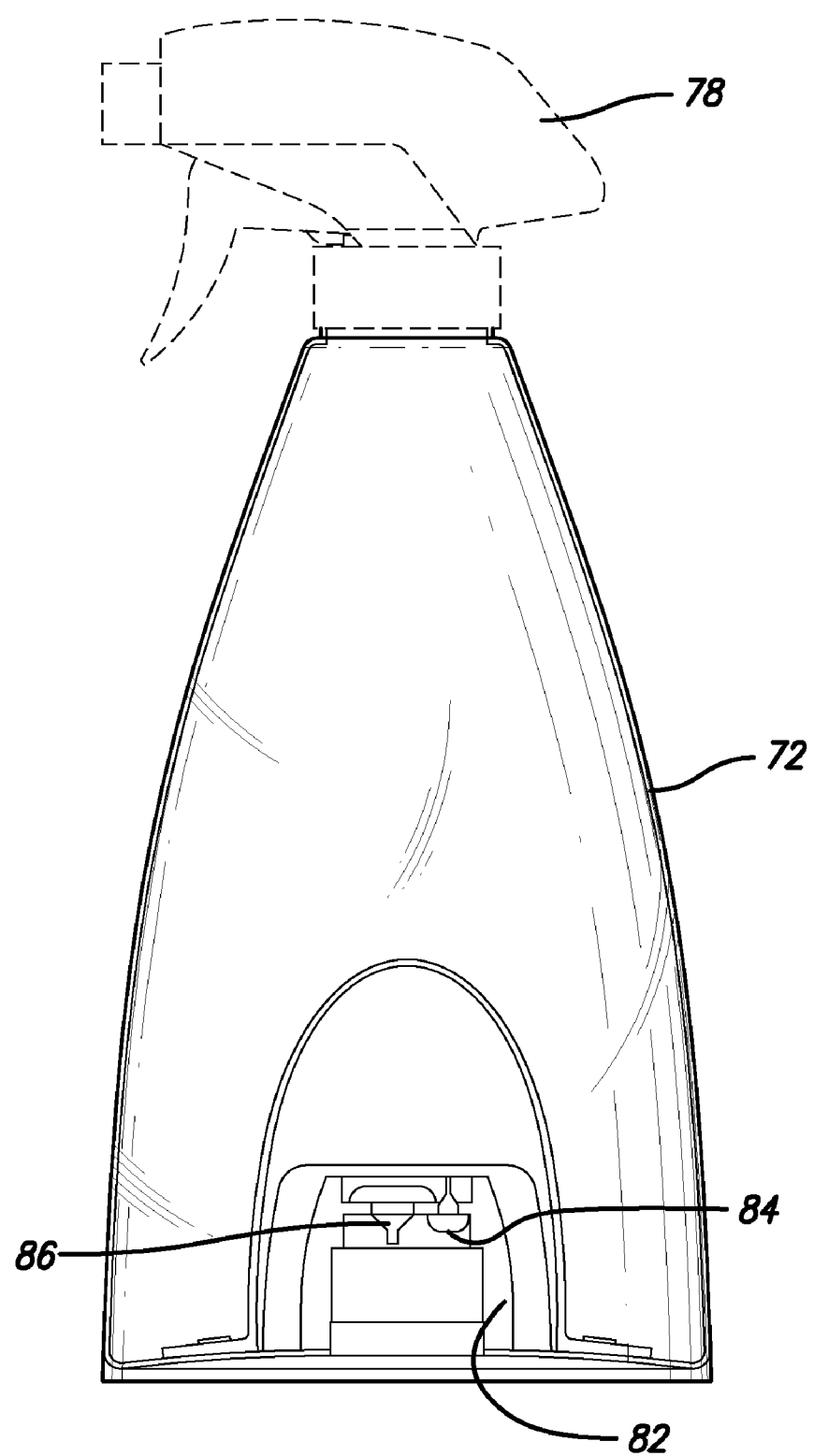
FIG. 3 is a side view of the mixer container of FIG. 2 without the second chamber and showing the valving according to the present invention.

In FIG. 3, there can be seen the improved valving assembly 80 in a recess 82 that is created to receive the lower chamber 74, best seen in FIG. 4, below. The valving assembly 80 includes a first one way valve 84 that admits fluid from the lower chamber 74 into the upper chamber 72. A second one way valve 86 blocks fluid from the lower chamber 74 but communicates with the surrounding environment to admit air into the lower chamber 74.

Figure 4:
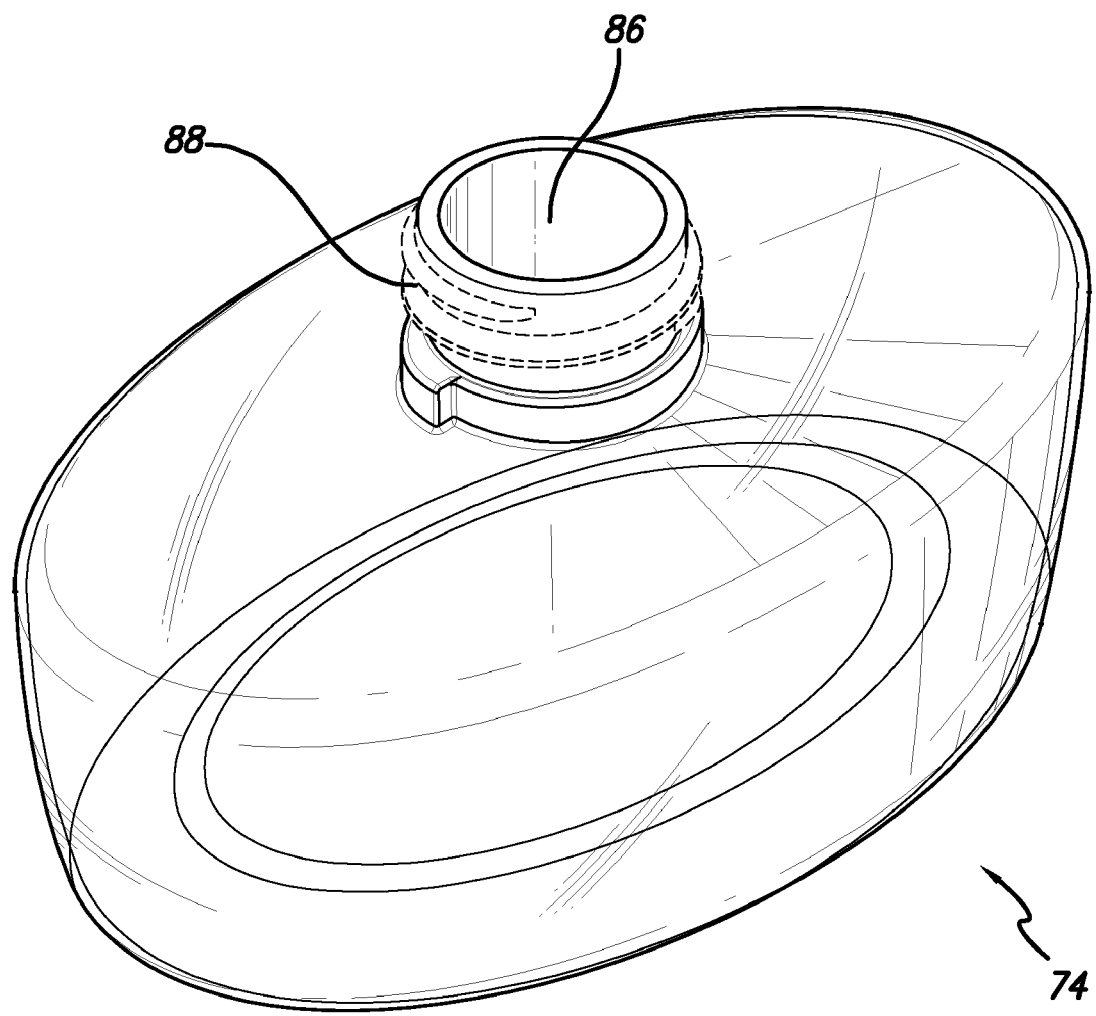
FIG. 4 is a perspective view of the second chamber of FIG. 2.

In FIG. 4, there is shown a preferred embodiment of the lower chamber 74 which is made of a clear, deformable material. The lower chamber 74 is preferably filled with a concentrate and supplied separately from the upper chamber 72. The lower chamber 74 has an elongated neck structure 86 which has exterior threads 88 which are received in a threaded opening in the upper chamber 72. When it necessary to fill the upper chamber 72, the neck 86 of the lower chamber 74 is inserted into the opening, engaging the threads 88 and rotating the lower chamber 86 until the fit is secure. To add the contents of the lower chamber 74, the combination is inverted, as shown in the cutaway perspective view of FIG. 5, below.

Figure 5:
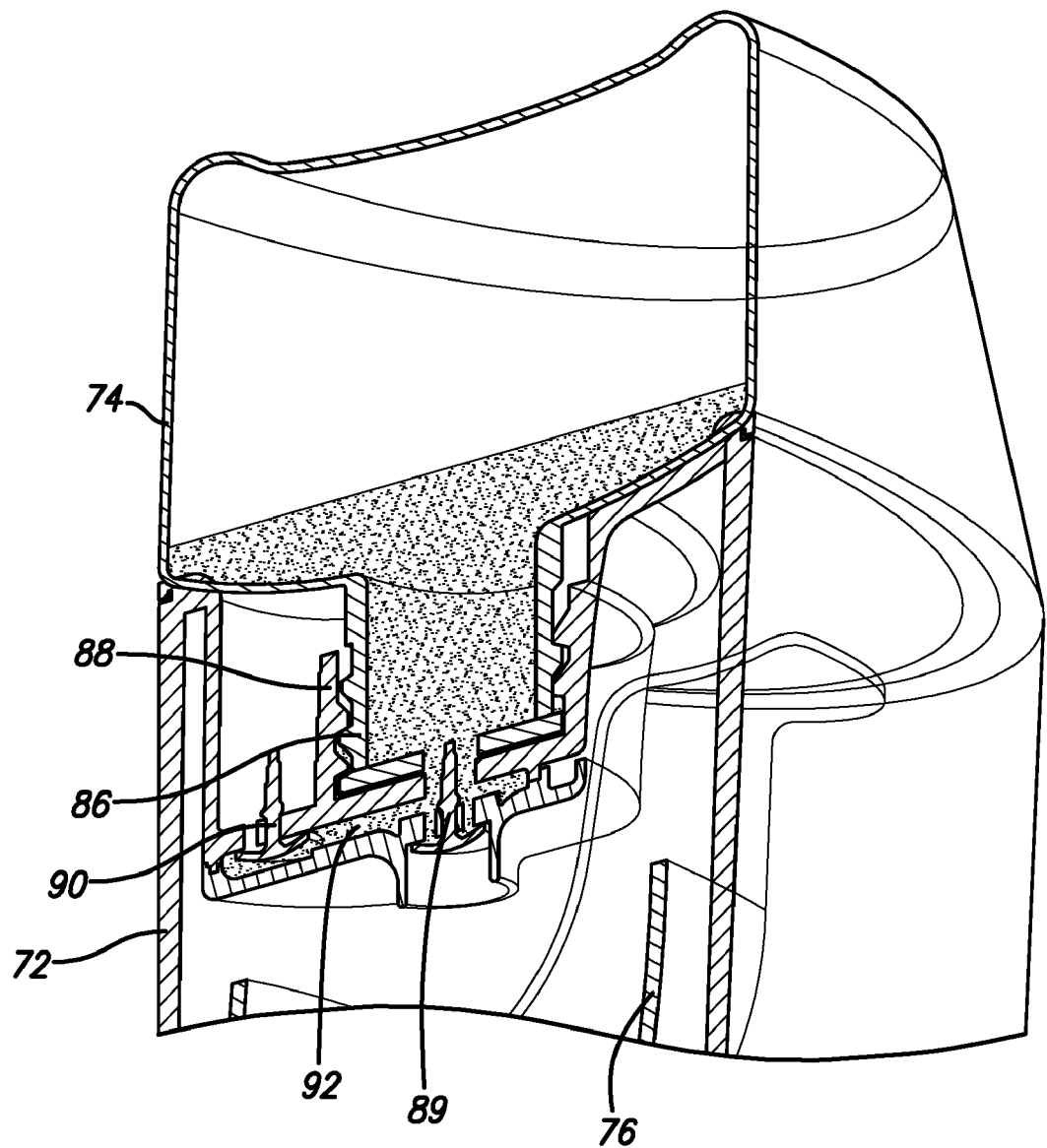
FIG. 5 is a sectional perspective view of the connected first and second chambers positioned to add concentrate to the mixing container of FIG. 2.

As seen in FIG. 5, the valving assembly 80 includes the first valve 84 through which concentrate is supplied from the lower container into the measurement container 76. The first valve 84 is a one way valve and permits fluid flow only from the lower chamber 74 into the upper chamber 72. There is also a second valve 90, also a one way valve but oppositely oriented which permits air flow from the exterior surroundings through a passage 92 into the interior of the lower chamber 74.

When transferring concentrate to the upper chamber 72, the passage 92 will contain concentrate that is ultimately returned to the lower chamber when the combined chambers are inverted to the normally upright orientation. In order to transfer concentrate to the upper chamber, manual pressure is exerted upon the lower chamber 74, deforming it and forcing the liquid concentrate through the first valve 84. However, when the pressure is relieved, the lower chamber 74 regains its shape, thereby reducing the pressure in its interior.

The second valve 90, which is opened by the greater pressure of the atmosphere, permits a flow of air into the lower chamber 74 through the passage 92, equalizing the pressure of the lower chamber 74 interior with the exterior atmospheric pressure. Depending upon how much concentrate is desired in the upper chamber 72, more than one cycle of applied and released pressure on the lower chamber 74 may be required. Equalizing the interior and exterior pressure permits repeated incremental amounts of concentrate to be added to the upper chamber 72.

It is intended that the container of the present invention be reusable such that each of the components other than the replaceable lower chamber may be used a number of times prior to their disposal. In this way, the mixer container acts as an appliance, accepting various types of input liquids. For example, the mixer container may be used in conjunction with one cleaning product until exhaustion of the diluted contents, whereupon a user may purchase and use an alternative cleaning product for use with the same mixer container, simply by replacing the replaceable lower chamber with one filled with a different product concentrate and suitably mixing the contents.

Similarly, the apparatus of this invention may be used for various types of products. Replacing only a portion of the container combination results in substantially less waste, over the long run than would be the case of replacing the entire container each time it is depleted. This results in benefits for the environment and less expense in disposing of the waste products created when the containers are discarded after several use cycles for each container. When each container has reached the end of its useful life, it may be discarded and recycled.

The cost to ship concentrate, as opposed to fully-diluted chemical mixtures, for example cleaners, drink and food additives, pesticides or herbicides, is substantially less. This results in substantial shipping cost savings for manufacturers of the products which must be used in diluted form and comparable savings to the users of the combined mixer container.

While the foregoing detailed description has described a preferred embodiment of a mixer container in accordance with the present invention, it is to be understood that the above description is illustrative only and not limiting of the disclosed invention. Indeed, it will be appreciated that the embodiment discussed above and the virtually infinite embodiments that are not mentioned could easily be within the scope and spirit of the present invention. Thus, the present invention is to be limited only by the claims as set forth below.

The invention claimed is:

1. A mixing and dispensing apparatus comprising:
   a first closable chamber having a base and being capable of holding a liquid;
   a replaceable deformable second closable chamber being capable of holding a liquid and being adapted to communicate with said first chamber; and valve means being located at the base of said first chamber for maintaining separation between the contents of said first and second chambers when said second chamber is coupled to said first chamber, said valve means including first and second, similarly oriented one way valve members;

wherein, when said first and second chambers are coupled together and in communication, said first valve member, in response to increased pressure in said second closable chamber, allows the introduction of the contents of said second closable chamber into said first closable chamber; and wherein said second valve member, in response to decreased pressure in said second chamber, allows the introduction of ambient air into said second chamber to equalize the pressure therein.

2. The apparatus of claim 1, further comprising means for attaching dispensing means to said first closable chamber.

3. The apparatus of claim 1, wherein said valve members are normally closed.

4. The apparatus of claim 1, further comprising measurement means disposed within said first closable chamber, and positioned to receive the contents of said second chamber through said first valve member.

5. The apparatus of claim 1, wherein said first closable chamber includes a threaded opening within which to receive said second closable chamber.

6. The apparatus of claim 5 wherein deforming said second closable chamber when said second chamber is coupled to said first chamber increases the pressure sufficient for transferring the contents of said second closable chamber through said first valve member into said first chamber.

7. The apparatus of claim 6 wherein removing the deformation from said second chamber reduces the pressure therein sufficiently for admitting ambient air through said second valve member to thereby allow the interior pressure of said second chamber to approach atmospheric pressure.

8. A method of using a combined mixing and dispensing apparatus comprising the steps of:
   a. affixing a replaceable deformable closable chamber containing a fluid concentrate to a fixed closable chamber having valve means;
   b. inverting the combined chambers to enable gravity assistance of fluid transfer;
   c. introducing incremental portions of the contents of said replaceable deformable closable chamber into said fixed closable chamber through said valve means with the aid of gravity;
   d. replacing each incremental portion as it is transferred with air through said valve means;
   e. emptying the contents of said replaceable deformable closable chamber over time; and
   f. replacing said replaceable deformable closable chamber with a new replaceable deformable closable chamber containing a fluid concentrate wherein said valve means includes first and second similarly oriented one-way valve members.

9. The method of claim 8, wherein said introducing step comprises applying manual pressure to said replaceable deformable chamber to thereby open said valve means to force an incremental portion of the contents of said replaceable deformable chamber into said fixed chamber.

10. The method of claim 9 including the step of removing manual pressure from said replaceable deformable chamber to cause a pressure drop sufficient for said valve means to allow the introduction of ambient air into the interior of said deformable chamber sufficient to equalize the pressure between the interior and exterior of said chamber.

11. A mixing and dispensing apparatus comprising:
   a. a first container having at its top, means for alternatively receiving sealing means and dispensing means and, at its bottom, valve means, said valve means including a first one-way valve for introducing fluid into said first container and a second similarly oriented one-way valve communicating with the environment and coupling means;
   b. a second, deformable container containing concentrated fluid having at its top a dispensing opening adapted to cooperate with said first container coupling means to create a conduit between said first and second containers;

whereby attaching said second container to said first container with said coupling means and inverting the combination permits fluid transfer through said first valve when said second container is deformed and, when not inverted, permits air to be admitted through said second valve and into said second container when said second container shape is restored.

12. The apparatus of claim 11, wherein said valve means include a passage between said second container and said second valve.

13. A refillable dispenser combination comprising:
   a. a first container having, at its top, means for receiving alternatively sealing means and dispensing means and, at its bottom, valve means, said valve means including a first one-way valve adapted to introduce fluid into said first container and a second similarly oriented, one way valve communicating with the exterior environment for drawing in ambient air when exterior pressure exceeds interior pressure; and
   b. a second, deformable container containing concentrated fluid and having a dispensing opening adapted to be coupled to said first container valve means in communication with said first one way valve;

whereby attaching said second container to said first container, inverting the combination and deforming said second container allows transfer of the concentrated fluid of said second container into said first container through said first valve and resumption of said second container's normal non inverted configuration allows introduction of air into said second container through said second valve.

14. A method of transferring concentrated fluid from a deformable storage container to a dispensing container including the steps of:
   a. coupling the top of said storage container to the base of said dispensing container;
   b. inverting the combination;
   c. deforming said storage container to increase the internal pressure;
   d. transferring concentrated fluid under pressure from said storage container to said dispensing container through a first one way valve in the base of said dispensing container;
   e. restoring the combination to its non inverted configuration and releasing said storage container to permit restoration of its original conformation lowering the pressure within said storage container; and
   f. restoring interior pressure in said storage container by introducing air from the exterior through a second similarly oriented one-way valve in the base of said dispensing container.

* * * * *

UNITED STATES PATENT AND TRADEMARK OFFICE
CERTIFICATE OF CORRECTION

PATENT NO. : 8,152,025 B2
APPLICATION NO. : 12/908226
DATED : April 10, 2012
INVENTOR(S) : Jason E. Foster It is certified that error appears in the above-identified patent and that said Letters Patent is hereby corrected as shown below:

In the Specifications:

Col. 3, Lines 65 - Col. 4, lines 1-6 should read,

As seen in FIG. 5, the valving assembly 80 includes the first valve 84 through which concentrate is supplied from the lower <u>chamber</u> 74 into the measurement container 76. The first valve 84 is a one way valve and permits fluid flow only from the lower chamber 74 into the upper chamber 72. There is also a second valve 90, also a one way valve, <u>similarly</u> oriented, which permits air flow from the exterior surroundings through a passage 92 into the interior of the lower chamber 74.

Signed and Sealed this
Ninth Day of July, 2013

Teresa Stanek Rea
*Acting Director of the United States Patent and Trademark Office*